(12) United States Patent
Zhang et al.

(10) Patent No.: US 12,436,704 B2
(45) Date of Patent: Oct. 7, 2025

(54) METHOD, ELECTRONIC DEVICE, AND COMPUTER PROGRAM PRODUCT FOR DATA MIGRATION

(71) Applicant: Dell Products L.P., Round Rock, TX (US)

(72) Inventors: Weibing Zhang, Beijing (CN); Lei Gao, Beijing (CN); Shuning Zhang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 67 days.

(21) Appl. No.: 18/501,231

(22) Filed: Nov. 3, 2023

(65) Prior Publication Data

US 2024/0354025 A1  Oct. 24, 2024

(30) Foreign Application Priority Data

Apr. 18, 2023 (CN) .......................... 202310418454.X

(51) Int. Cl.
*G06F 3/06* (2006.01)

(52) U.S. Cl.
CPC .......... *G06F 3/0647* (2013.01); *G06F 3/0608* (2013.01); *G06F 3/0652* (2013.01); *G06F 3/0673* (2013.01)

(58) Field of Classification Search
CPC .... G06F 3/0608; G06F 3/0641; G06F 3/0647; G06F 3/0652; G06F 3/067; G06F 3/0673
See application file for complete search history.

(56) References Cited

U.S. PATENT DOCUMENTS

| | | | |
|---|---|---|---|
| 9,311,375 B1 | 4/2016 | Naik | |
| 10,514,861 B1 | 12/2019 | Basov et al. | |
| 11,256,587 B2 | 2/2022 | Mueller et al. | |
| 11,487,460 B2 | 11/2022 | Keller et al. | |
| 11,675,789 B2 | 6/2023 | Shatsky et al. | |
| 2010/0191790 A1* | 7/2010 | Kincaid | G06F 17/15 708/424 |
| 2016/0210044 A1 | 7/2016 | Mitkar et al. | |
| 2020/0142643 A1 | 5/2020 | Armangau et al. | |
| 2020/0241806 A1 | 7/2020 | Dalmatov et al. | |
| 2020/0249872 A1 | 8/2020 | Dalmatov et al. | |
| 2021/0223993 A1* | 7/2021 | Esaka | G06F 3/0659 |
| 2022/0137885 A1 | 5/2022 | Zakharkin et al. | |
| 2022/0342594 A1 | 10/2022 | Vankamamidi et al. | |

* cited by examiner

*Primary Examiner* — Yong J Choe
(74) *Attorney, Agent, or Firm* — BainwoodHuang

(57) ABSTRACT

Techniques for data migration involve obtaining feature data of a plurality of logical storage units in a first storage device, the feature data comprising deduplication information of each of the plurality of logical storage units. Such techniques further involve determining, based on the feature data, a set of similarity values between the plurality of logical storage units. Such techniques further involve migrating a logical storage unit having a similarity value higher than a similarity threshold among the plurality of logical storage units from the first storage device to a second storage device different from the first storage device.

20 Claims, 7 Drawing Sheets

500

| | LUN01 | LUN02 | LUN03 | LUN04 | LUN05 | LUN06 | LUN07 | LUN08 | LUN09 | LUN10 | LUN11 | LUN12 |
|---|---|---|---|---|---|---|---|---|---|---|---|---|
| LUN01 | 1 | 0.29 | 0.51 | 0.3 | -0.76 | -0.74 | 0.42 | -0.19 | 0.5 | 0.45 | 0.86 | 0.4 |
| LUN02 | -0.29 | 1 | -0.21 | -0.09 | -0.44 | -0.34 | 0.23 | -0.2 | 0.01 | 0.84 | 0.53 | -0.003 |
| LUN03 | -0.51 | -0.21 | 1 | -0.37 | 0.79 | 0.86 | -0.74 | 0.73 | -0.57 | -0.13 | -0.34 | -0.47 |
| LUN04 | 0.3 | -0.09 | -0.37 | 1 | -0.57 | -0.55 | 0.6 | 0.21 | 0.87 | -0.23 | 0.09 | 0.96 |
| LUN05 | -0.76 | -0.44 | 0.79 | -0.57 | 1 | 0.96 | -0.87 | 0.37 | -0.77 | -0.36 | -0.63 | -0.68 |
| LUN06 | -0.74 | -0.34 | 0.86 | -0.55 | 0.96 | 1 | -0.85 | 0.44 | -0.75 | -0.29 | -0.59 | -0.66 |
| LUN07 | 0.42 | 0.23 | -0.74 | 0.6 | -0.87 | -0.85 | 1 | -0.31 | 0.76 | 0.02 | 0.3 | 0.68 |
| LUN08 | -0.19 | -0.2 | 0.73 | 0.21 | 0.37 | 0.44 | -0.31 | 1 | -0.01 | -0.17 | -0.13 | 0.11 |
| LUN09 | 0.5 | 0.01 | -0.57 | 0.87 | -0.77 | -0.75 | 0.76 | -0.01 | 1 | -0.01 | 0.27 | 0.92 |
| LUN10 | 0.45 | 0.84 | -0.13 | -0.23 | -0.36 | -0.29 | 0.02 | -0.17 | -0.01 | 1 | 0.67 | -0.13 |
| LUN11 | 0.86 | 0.53 | -0.34 | 0.09 | -0.63 | -0.59 | 0.3 | -0.13 | 0.27 | 0.67 | 1 | 0.19 |
| LUN12 | 0.4 | -0.003 | -0.47 | 0.96 | -0.68 | -0.66 | 0.68 | 0.11 | 0.92 | -0.13 | 0.19 | 1 |

FIG. 5

METHOD, ELECTRONIC DEVICE, AND COMPUTER PROGRAM PRODUCT FOR DATA MIGRATION

CROSS-REFERENCE TO RELATED APPLICATION

This application claims priority to Chinese Patent Application No. CN202310418454.X, on file at the China National Intellectual Property Administration (CNIPA), having a filing date of Apr. 18, 2023, and having "METHOD, ELECTRONIC DEVICE AND COMPUTER PROGRAM PRODUCT FOR DATA MIGRATION" as a title, the contents and teachings of which are herein incorporated by reference in their entirety.

TECHNICAL FIELD

Embodiments of the present disclosure relate to the field of computer storage, and more particularly, to a method, an electronic device, and a computer program product for data migration.

BACKGROUND

As storage products iterate, user data is generally migrated from a source storage device to a target storage device. For example, when the scale of a user service changes, historical data needs to be migrated from an old storage device to a new storage device. Data migration involves data transfer and a connection from one storage system of the source storage device to another storage system of the target storage device. There are many factors to consider when considering how to perform a migration. Since the factor of distribution of data blocks is not taken into account in the process of data migration from the source storage device to the target storage device at present, data migrated to the target storage device may have a low data reduction rate. In other words, the data migrated to the target storage device has a low deduplication rate.

SUMMARY OF THE INVENTION

Embodiments of the present disclosure provide a solution for data migration.

In a first aspect of the present disclosure, a method for data migration is provided. The method may include obtaining feature data of a plurality of logical storage units in a first storage device, the feature data including deduplication information of each of the plurality of logical storage units. The method may further include determining, based on the feature data, a set of similarity values between the plurality of logical storage units. Further, the method may include migrating a logical storage unit having a similarity value higher than a similarity threshold among the plurality of logical storage units from the first storage device to a second storage device different from the first storage device.

In a second aspect of the present disclosure, an electronic device is provided, including a processor; and a memory coupled to the processor and having instructions stored therein, wherein the instructions, when executed by the processor, cause the electronic device to perform actions including: obtaining feature data of a plurality of logical storage units in a first storage device, the feature data including deduplication information of each of the plurality of logical storage units; determining, based on the feature data, a set of similarity values between the plurality of logical storage units; and migrating a logical storage unit having a similarity value higher than a similarity threshold among the plurality of logical storage units from the first storage device to a second storage device different from the first storage device.

In a third aspect of the present disclosure, a computer program product is provided. The computer program product is tangibly stored on a computer-readable medium and includes machine-executable instructions. The machine-executable instructions, when executed, cause a machine to perform any steps of the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

Example embodiments of the present disclosure are described in more detail with reference to the accompanying drawings, so that the above and other objectives, features, and advantages of the present disclosure will become more apparent, wherein identical or similar reference numbers generally represent identical or similar components in the example embodiments of the present disclosure. In the accompanying drawings:

FIG. 5 illustrates a schematic diagram of similarity values between logical storage units according to an embodiment of the present disclosure;

DETAILED DESCRIPTION

Figure 1:
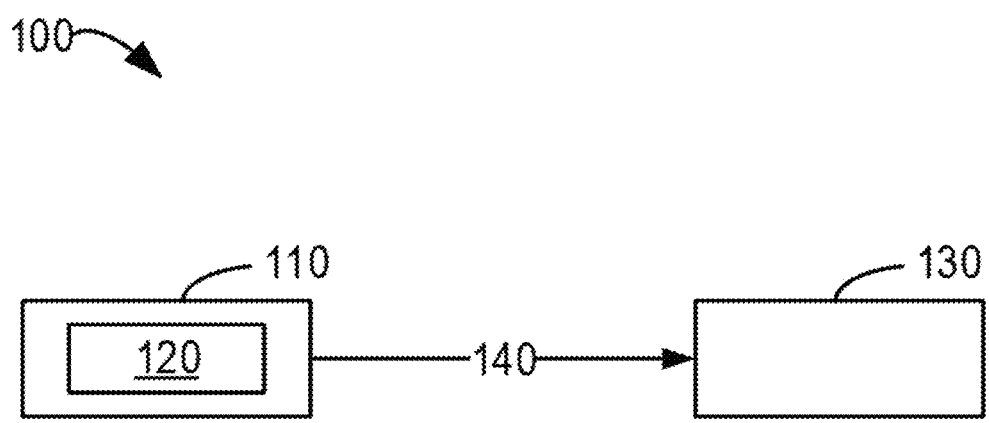
FIG. 1 illustrates a schematic diagram of an example environment according to embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments illustrated in the accompanying drawings.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "a set of example embodiments." The term "another embodiment" indicates "a group of other embodiments." The terms "first," "second," and the like may refer to different or identical objects. Other explicit and implicit definitions may also be included below.

Following on the discussion above, there are several factors to consider when considering how to perform data migration. For example, the use of data by a user should not be interrupted during technological update. In other words, the process of migrating data from a source storage device to a target storage system is transparent to the user. To improve user experience to the maximum extent, transparent migration that does not interfere with host access to data is required to minimize the impact on the user's services. Of course, the volume of data and its size (number of block devices, file systems, etc.) are also important factors to consider.

With the introduction of new storage devices, users may have the need to migrate data from old storage devices to new storage devices. Since older storage devices often support the inline deduplication (ILD) technology, maintaining or even increasing of a data reduction rate during data migration is important for improving user experience.

Data deduplication, or deduplication, reduces the amount of storage required for user data by retaining only a small number of copies (usually only one copy) of a data block with given content. Data deduplication done in real time as data enters a storage array is called inline deduplication (ILD). However, deduplication distribution of individual data blocks is not taken into account in the conventional data migration process from a source storage device to a target storage device. Therefore, data migrated to the target storage device usually has a low deduplication rate. In addition, conventional data migration technologies also have the following problems: higher actual space utilization due to low chance of sharing blocks; higher disk wear as more storage blocks need to be stored on a disk tier; longer time for data migration; increased demand for caches to store deduplicated data blocks; and degradation of the overall performance of the storage system.

In order to solve, at least in part, the above disadvantages, embodiments of the present disclosure provide a novel solution for data migration. The present disclosure is intended to provide a novel solution for data migration based on relationships between data features of storage objects. As an example, data features of a logical storage unit may be represented as a distribution of the number of ILDs in the logical storage unit. A migration sequence of logical storage units to be migrated can be determined by collecting and counting the number of ILDs and then calculating, based on the number, the similarities between the logical storage units prior to data migration. With this design, a data deduplication function of a source storage device can be utilized to increase a data reduction rate of the target storage device, thereby helping to save space, improving migration performance, and improving user experience.

FIG. 1 illustrates a schematic diagram of an example environment 100 according to embodiments of the present disclosure. In the example environment 100, a device and/or process according to the embodiments of the present disclosure can be implemented. As shown in FIG. 1, the example environment 100 may include a first storage device 110 with user data stored, a computing device 120 disposed in the first storage device 110, and a second storage device 130 to which the user data is expected to be migrated. It should be understood herein that the first storage device 110 may also be referred to as a source storage device, and the second storage device 130 may also be referred to as a target storage device.

In addition, the user data is typically stored in the form of logical storage units, so the first storage device 110 has a plurality of logical storage units for storing the user data. In some embodiments, the logical storage units may be LUNs (logical unit number modules) or files. According to the data migration technology of the present disclosure, the computing device 120 may be used to sort the plurality of logical storage units in the first storage device 110 and transfer the sorted series of logical storage units 140 to the second storage device 130.

In some embodiments, the computing device 120 may be any device with a computing capability. As a non-limiting example, the computing device may be any type of fixed computing device, mobile computing device, or portable computing device, including but not limited to a desktop computer, a laptop computer, a notebook computer, a netbook computer, a tablet computer, and the like. All or part of the components of the computing device may be distributed in a cloud. The computing device and the nodes connected thereto may adopt a cloud-edge architecture.

It should be understood that FIG. 1 is intended only to illustrate some concepts of the present disclosure and is not intended to limit the scope of the present disclosure.

The process of data migration according to an embodiment of the present disclosure will be described in detail below in connection with FIG. 2. For case of understanding, specific data mentioned in the following description is illustrative and is not intended to limit the protection scope of the present disclosure. It should be understood that embodiments described below may also include additional actions not shown and/or may omit actions shown, and the scope of the present disclosure is not limited in this regard.

Figure 2:
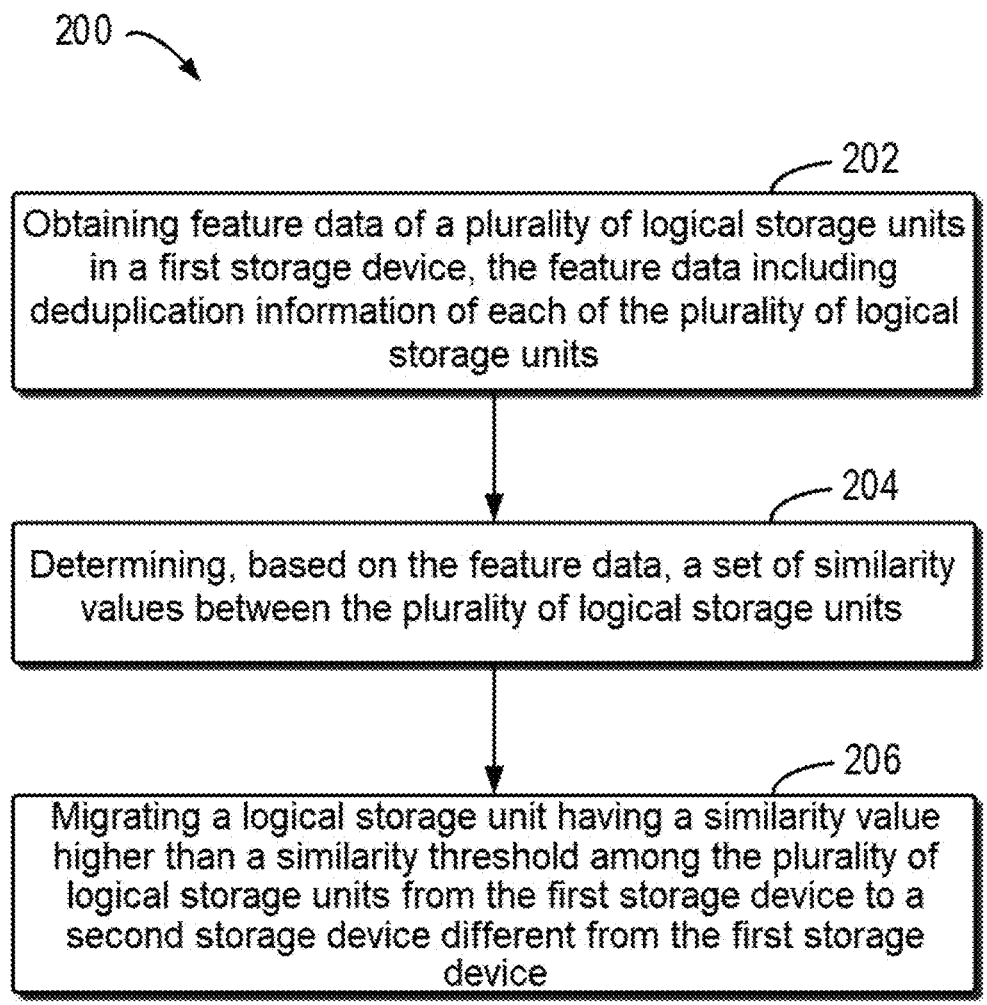
FIG. 2 illustrates a flow chart of a process of data migration according to an embodiment of the present disclosure.

FIG. 2 illustrates a schematic diagram of a process 200 of data migration according to an embodiment of the present disclosure. In some embodiments, the process 200 may be implemented in the computing device 120 in FIG. 1. The process 200 of data migration according to an embodiment of the present disclosure is described now with reference to FIG. 2. For case of understanding, specific examples mentioned in the following description are illustrative and are not intended to limit the protection scope of the present disclosure.

As shown in FIG. 2, at 202, the computing device 120 may obtain feature data of a plurality of logical storage units in the first storage device 110. It should be understood that the feature data may include deduplication information of each of the plurality of logical storage units.

Figure 3:
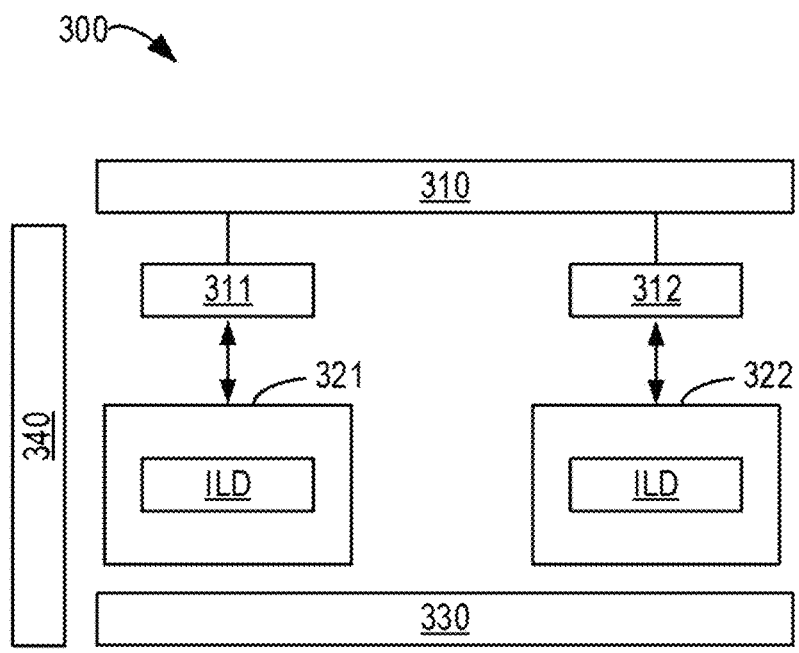
FIG. 3 illustrates a simplified schematic diagram regarding an internal architecture of a first storage device according to an embodiment of the present disclosure.

In order to more clearly describe the details of the present disclosure, the first storage device 110 will be described in detail below with reference to FIG. 3. FIG. 3 illustrates a simplified schematic diagram regarding an internal architecture 300 of the first storage device 110 according to an embodiment of the present disclosure. It should be understood that the first storage device 110 may be a Unity device, which supports ILD at each LUN level based on a common block file system (CBFS). As shown in FIG. 3, a host 310 is associated with a plurality of logical storage units such as a LUN 311 and a LUN 312, and these logical storage units each may be connected in communication to their respective CBFS containers via specific protocols. As an example, the LUN 311 is connected in communication to a CBFS container 321, and the LUN 312 is connected in communication to a CBFS container 322. The CBFS containers 321, 322 each include ILD units for their respective LUNs. Ultimately, IO operations from the host 310 may be embodied at a storage pool 330.

As an example, after the host 310 receives user IO, the Unity device may perform a hash function calculation on each data block in input data to determine summary information of each data block. If the summary information of the current data block is the same as summary information being maintained, it indicates that the current data block can be duplicated. If the summary information of the current data block does not hit the summary information being maintained, then the summary information of the current data block can be added to the summary information being maintained. Each logical storage unit maintains summary information for a different data block. As an example, the ILD units of the Unity device use the SHA512 hash function to create summary information used to determine whether the data blocks are identical. In other words, each LUN has its own hash table to perform a deduplication operation. Therefore, via a control path (such as a control path 340), it is possible to obtain the number of deduplication operations, performed against any summary information, of each LUN.

Figure 4:
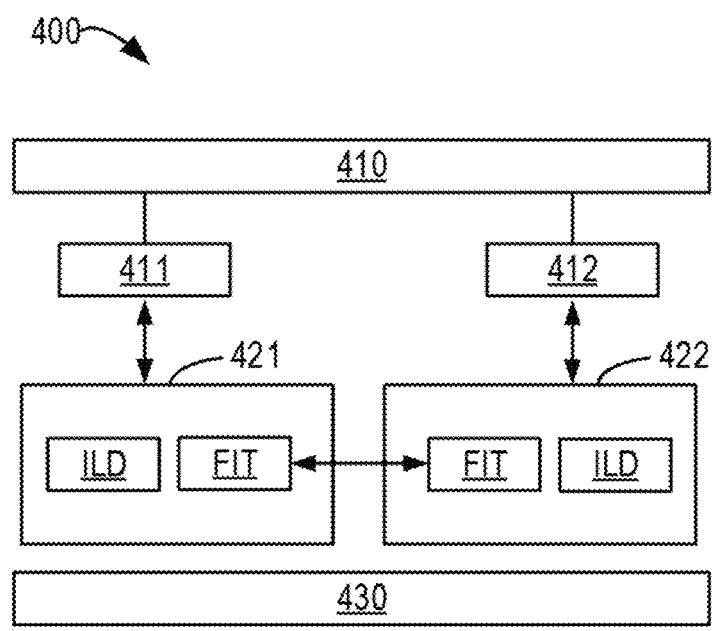
FIG. 4 illustrates a simplified schematic diagram regarding an internal architecture of a second storage device according to an embodiment of the present disclosure.

Accordingly, the second storage device 130 will be described in detail below with reference to FIG. 4. FIG. 4 illustrates a simplified schematic diagram regarding an internal architecture 400 of the second storage device 130 according to an embodiment of the present disclosure. It should be understood that the second storage device 130 may be a PowerStore device that also has an ILD function. Unlike the solution of maintaining the ILD of each LUN in the Unity device, the ILDs in the PowerStore device use a shared global hash table for all LUNs to perform deduplication operations.

As shown in FIG. 4, a host 410 is associated with a plurality of logical storage units such as a LUN 411 and a LUN 412, and these logical storage units each may be connected in communication to their respective containers via specific protocols. As examples, the LUN 411 is connected in communication to a container 421, and the LUN 412 is connected in communication to a container 422. The containers 321, 322 each include an ILD unit for the respective LUN and a fingerprint index table FIT. As described above, the fingerprint index table is shared globally. Ultimately, IO operations from the host 410 can be represented at a disk 430. The fingerprint index table FIT is used to perform ILDs. Only entries stored in this index table are used to find a shared opportunity. The fingerprint index table FIT is used to store indexes, so index data can be accessed and updated quickly. Generally, the indexes will be maintained in a memory. Similar to the Unity device, a user IO data block from the host 410 can be identified as summary information based on a hash calculation, so that it may be determined in the fingerprint index table whether the data block is a hit or not. Since the memory is a limited resource in the system, the LRU-based fingerprint index table FIT only retains entries for a subset of all blocks in the system.

It should be understood that both the Unity device and the PowerStore device are used only for the purposes of illustration. The embodiments of the present disclosure may also use other types of storage devices to store data. Further, in addition to the case where the Unity device acts as the first storage device 110 and the PowerStore device acts as the second storage device 120, the Unity device may also act as the first storage device 110, and the PowerStore device may also act as the second storage device 120. Preferably, the Unity device and the PowerStore device may be configured to both use an LRU-based hash table to perform a deduplication operation. Alternatively or additionally, the Unity device and the PowerStore device may also be configured to use different deduplication mechanisms.

Different data IO orders during data migration from the first storage device 110 to the second storage device 120 may result in different data reduction ratios. Therefore, features of each logical storage unit at the first storage device 110 need to be analyzed.

In some embodiments, to obtain feature data of each logical storage unit, for each logical storage unit of the plurality of logical storage units, the computing device 120 may obtain the number of occurrences of each of the plurality of deduplicated data blocks in each logical storage unit, and then determine the feature data of each logical storage unit based on the number of occurrences of the each deduplicated data block. As an example, the computing device 120 may create a cache region in the memory for each logical storage unit to store the number of times the written data is deduplicated and the corresponding summary information.

In some embodiments, when a data block in a logical storage unit has the same summary information (i.e., a hit) as one of a plurality of pieces of summary information being maintained in the cache region, the computing device 120 may perform a deduplication operation on this data block and count the deduplication operations for this data block. Optionally or additionally, only some of the data blocks in a logical storage unit are used to determine the feature data of this logical storage unit. For example, only the data block having the number of deduplication operations greater than a threshold number is identified as a deduplicated data block for use in determining the feature data of this logical storage unit. Specifically, the cache region described above may be divided into a plurality of parts. As an example, the first part is used to store summary information of data blocks that have been read and written frequently in the recent period. The second part is used to store summary information of data blocks that have been rarely read or written in the recent period. The third part is used to store summary information of data blocks that cannot be currently classified. Therefore, at least the summary information of the first part and its count may be used to determine feature data of the logical storage unit, and the summary information may be considered as sample data of this logical storage unit. In this manner, the summary information of the data blocks that are frequently deduplicated may be used to represent a feature of the logical storage unit, and the feature may be used as an indicator for screening two or more logical storage units with a high deduplication rate.

In some embodiments, a counter may be used to count the deduplication operations for each deduplicated data block. The counter will be updated as the IO path changes. For example, a commit of a deduplicated data block will increase the corresponding count, while a deletion of a deduplicated data block will decrease the corresponding count. These counts will be collected and stored as IO statistical information when there is a request to perform a data migration. The collection of these counts can be used to represent the deduplication capability of each logical storage unit.

In some embodiments, the deduplication operation for the first storage device 110 and the deduplication operation for the second storage device 130 are both performed based on the hash value of each data block.

Returning to FIG. 2, at 204, the computing device 120 may determine, based on the acquired feature data, a set of similarity values between a plurality of logical storage units. In some embodiments, the computing device 120 may determine a similarity value between feature data of one logical storage unit and feature data of another logical storage unit in the first storage device 110. As an example, the feature data of each logical storage unit may be compared pairwise with the feature data of another logical storage unit so that the similarity of features of each pair of logical storage units may be determined.

In some embodiments, the similarity value may be Euclidean distance or Pearson correlation coefficient. For feature data of two logical storage units, the Euclidean distance can be used to measure the similarity of distributions of the deduplicated data blocks. Assuming that a set of sample data of one logical storage unit is C and a set of sampled data of another logical storage unit is O, the two sets may be denoted as $\{C_0, C_1, C_2, \ldots, C_m\}$ and $\{O_0, O_1, O_2, \ldots, O_m\}$, respectively. Values in the set are used to represent the count of each piece of summary information, and each position corresponds to the same piece of summary information. If one set does not contain a piece of summary information from another set, the corresponding count of that summary information may be replaced by zero. As a result, the Euclidean distance D(C, O) between the set C and the set O can be expressed by the following Equation (1):

$$D(C, O) = \sqrt{\sum_{i=0}^{m}(c_i - o_i)^2} \quad \text{Equation (1)}$$

Similarly, the computing device 120 can calculate a data sampling distribution distance $D(S_x, S_y)$ between the deduplicated data sets $(S_x, S_y)$ of any two logical storage units. Assuming that the number of data sets is n, the distance matrix for all deduplicated sampled data sets can be expressed according to the following Equation (2):

$$\begin{bmatrix} D(S_0, S_0) & \ldots & D(S_0, S_n) \\ \vdots & \ddots & \vdots \\ D(S_n, S_0) & \ldots & D(S_n, S_n) \end{bmatrix} \quad \text{Equation (2)}$$

By determining the Euclidean distance between the logical storage units, the present disclosure can determine the similarities between the logical storage units, so as to prepare for subsequent migration sorting.

In some embodiments, relationships between change vectors of distributions of the deduplicated data blocks between the data sets can be further evaluated based on the Euclidean distance. In other words, the similarity value may be the Pearson correlation coefficient.

For two distributions of deduplicated data blocks, the distance can be expressed as a vector $X=(x_0, x_1, \ldots, x_n)=(D(S_x,S_0), D(S_x,S_1), \ldots, D(S_x,S_n))$ and $Y=(y_0, y_1, \ldots, y_n)=(D(S_y,S_0), \ldots, D(S_y,S_1), \ldots, D(S_y,S_n))$, and the Pearson correlation coefficient can be calculated using the following Equation (3):

$$P(X, Y) = \frac{\sum_{i=0}^{n}(x_i - \bar{x})(y_i - \bar{y})}{\sqrt{\left(\sum_{i=0}^{n}(x_i - \bar{x})^2\right)\left(\sum_{i=0}^{n}(y_i - \bar{y})^2\right)}} \quad \text{Equation (3)}$$

where Xi and Yi denote different values of X and Y.

It should be understood that the above Pearson correlation coefficient is normalized and may be expressed as any value from −1 to 1. If the value is between 0 and 1 (excluding 0), it indicates that the two variables are positively correlated. If the value is between −1 and 0 (excluding 0), it indicates that the two variables are negatively correlated. If the value is 0, it indicates that there is no correlation between the two variables.

For a dataset of deduplicated blocks, the correlation coefficient indicates a similarity relationship of distributions of the deduplicated blocks. In other words, the correlation coefficient is the way a dataset is rated by other datasets based on the data block distribution similarity. FIG. 5 illustrates a schematic diagram of similarity values 500 between logical storage units according to an embodiment of the present disclosure. As shown in FIG. 5, there are 12 LUNs in this embodiment, namely, a LUN01, a LUN02, a LUN03, a LUN04, a LUN05, a LUN06, a LUN07, a LUN08, a LUN09, a LUN10, a LUN11, and a LUN12. FIG. 5 illustrates similarity values between these LUNs.

Returning to FIG. 2, at 206, the computing device 120 may migrate a logical storage unit having a similarity value higher than a similarity threshold among the plurality of logical storage units from the first storage device 110 to the second storage device 130.

In some embodiments, the computing device 120 may create a data transfer queue for the logical storage units in the first storage device 110 and arrange a first logical storage unit of the plurality of logical storage units at a first position of the data transfer queue. It should be understood that the first logical storage unit may be configured as a logical storage unit with the highest deduplication ratio among the plurality of logical storage units in order to achieve a superior technical result. Further, the computing device 120 may determine, from other logical storage units of the plurality of logical storage units than the first logical storage unit, a second logical storage unit whose similarity value with the first logical storage unit is higher than the similarity threshold, and arrange the second logical storage unit at a second position after the first position in the data transfer queue to perform data migration. Next, alternatively or additionally, the computing device 120 may determine, from other logical storage units in the plurality of logical storage units than the first logical storage unit and the second logical storage unit, a third logical storage unit whose similarity value with the second logical storage unit is higher than the similarity threshold or other similarity thresholds, and arrange the third logical storage unit at a third position after the second position in the data transfer queue to perform data migration.

Figure 6:
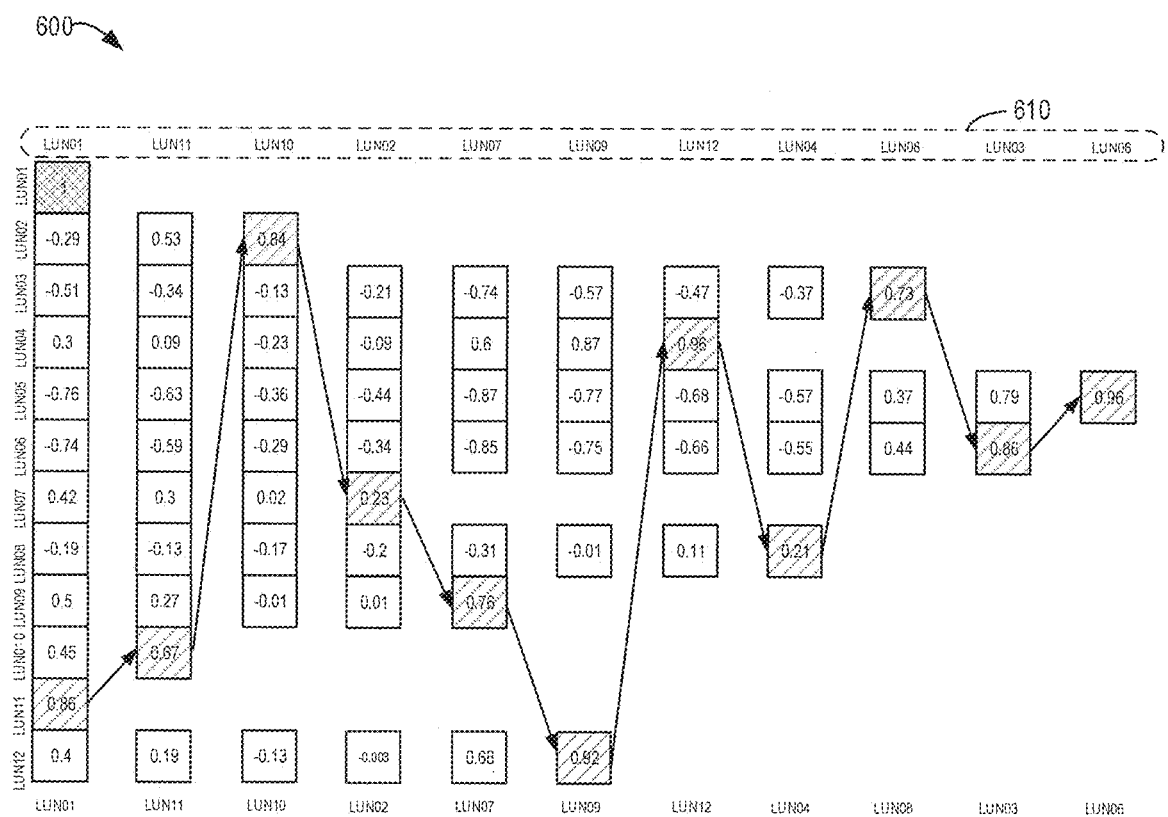
FIG. 6 illustrates a schematic diagram of determining, based on similarity values, a data migration sequence according to an embodiment of the present disclosure.

Specifically, FIG. 6 illustrates a schematic diagram of a scenario 600 for determining, based on similarity values, a data migration sequence according to an embodiment of the present disclosure. As shown in FIG. 6, a LUN01 with the highest deduplication ratio among a plurality of LUNs is first determined to be at a first position of the sequence. After that, the LUN with the highest similarity value is found from a column (or a row) of the LUN01 in FIG. 5. Since the highest similarity value in this column is "0.86"," the LUN11 in the row (or column) where "0.86" is located can be determined to be at a second position of the sequence. Next, similarity values of the LUN01 and the LUN11 that have been sorted in the LUN11 can be filtered out. The highest similarity value "0.67" is found among the remaining similarity values, so that the LUN10 in the row (or column) where "0.67" is located can be determined to be at a third position of the sequence. In this way, all LUNs can be sorted. The left-to-right order of the LUNs in a dashed box 610 is a determined data migration sequence.

With this migration sequence, the data deduplication capability of the first storage device 110 can be retained. When deduplication information from the first storage device 110 is added to the second storage device 130, the close relationship of the deduplicated data set will bring more deduplication opportunities. This will bring more deduplication opportunities and increase the data reduction rate.

Figure 7:
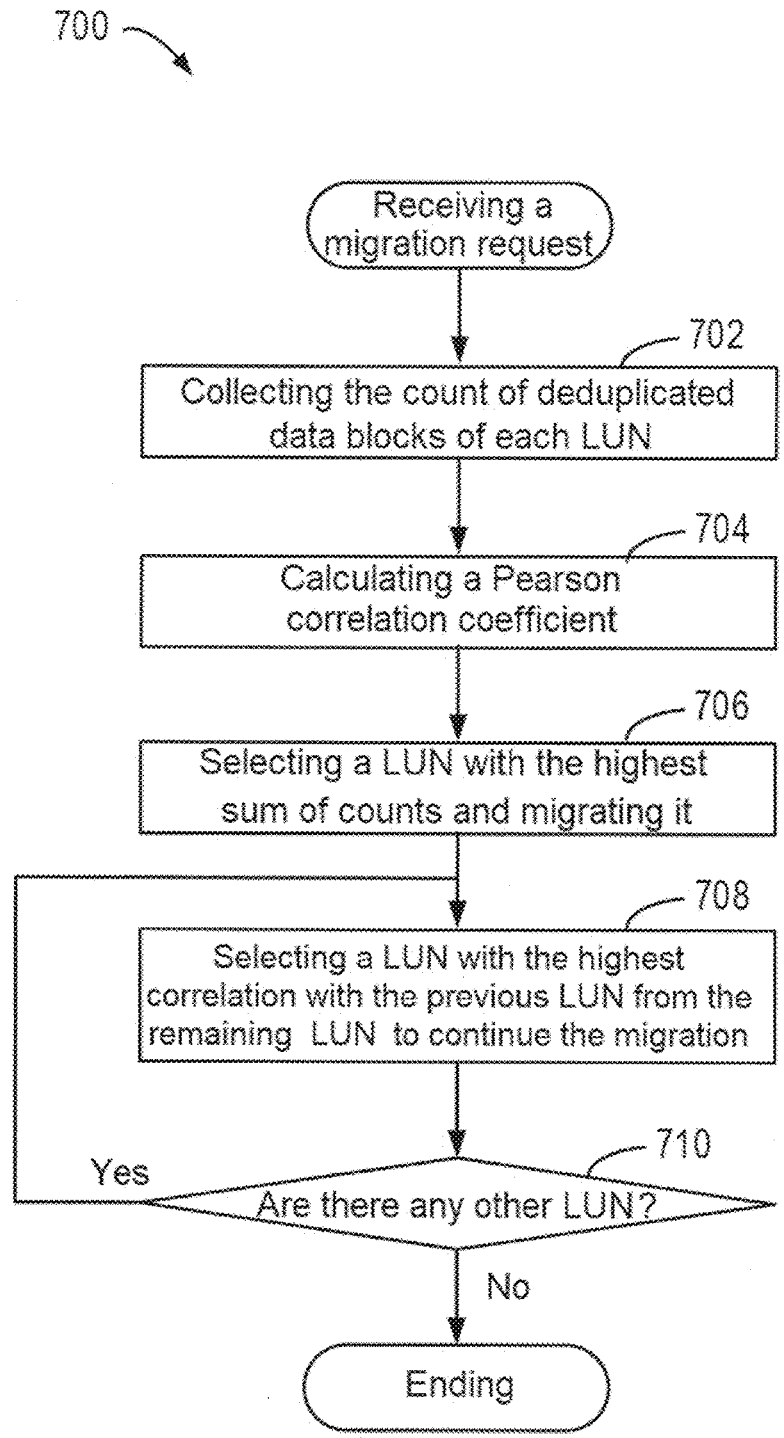
FIG. 7 illustrates a flow chart of determining, based on similarity values, a data migration sequence according to an embodiment of the present disclosure.
Figure 8:
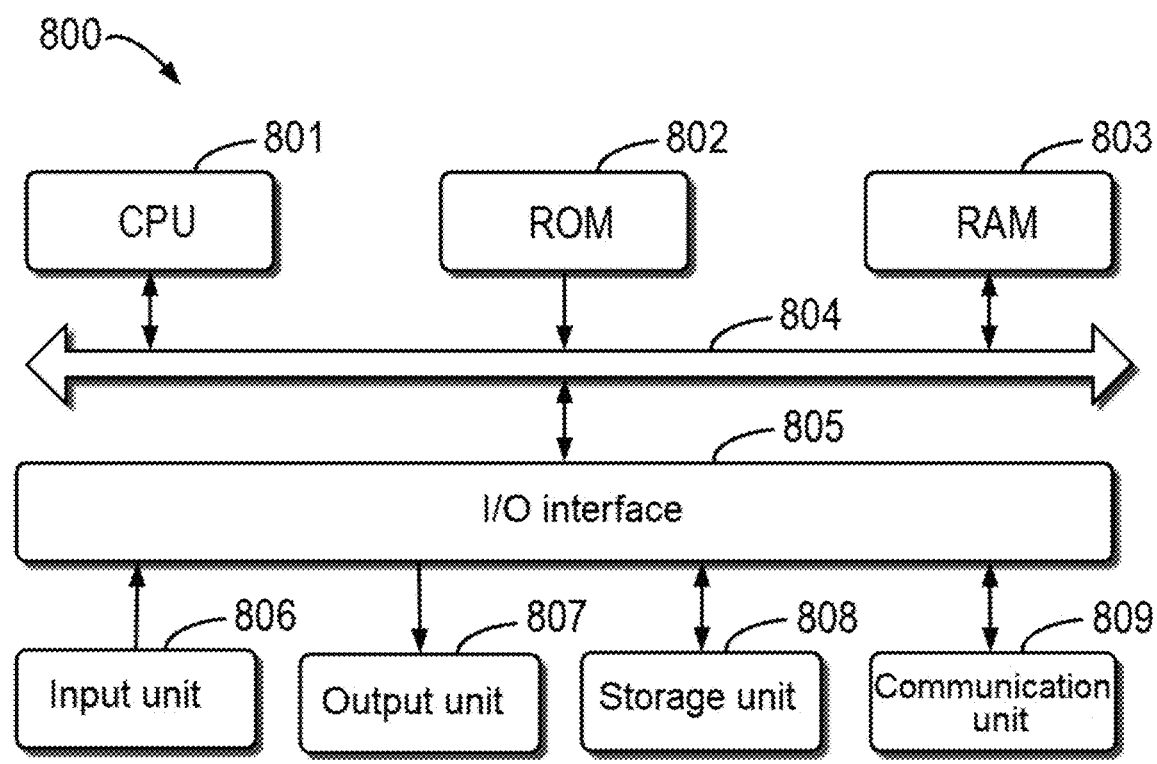
FIG. 8 illustrates a block diagram of an example device that may be configured to implement embodiments of the present disclosure.

FIG. 7 illustrates a flow chart of a process 700 for determining, based on similarity values, a data migration sequence according to an embodiment of the present disclosure.

Shown in FIG. 7, after a migration request from the user or the system is received at the source storage device, at 702, the count of deduplicated data blocks for each LUN can be collected. At 704, the Pearson correlation coefficient between the LUNs is calculated using the Equation (3) above. At 706, a LUN with the highest sum of counts from all LUNs in the source storage device is selected and prioritized for migration to the target storage device. It should be understood that 704 and 706 may be executed in any order. After that, at 708, a LUN with the highest correlation with a previous LUN is selected from the remaining LUNs to continue the migration. At 710, it is determined whether there are other LUNs that need to be migrated. If there are other LUNs that need to be migrated, it returns to 708; otherwise, the data migration ends.

According to the embodiments of the present disclosure, the count of the deduplicated data blocks at the source storage device may be used to determine the feature data of each logical storage unit to determine the similarities between the logical storage units, whereby the logical storage units with high similarity or correlation may be migrated with priority, making the deduplication operations at the target storage device more convenient, increasing the deduplication opportunities, and increasing the data reduction rate.

In addition, as fewer actual data blocks need to be allocated and written to a disk, the performance of data migration may be improved with the high deduplication rate, which helps reduce wear. Further, as fewer data caches are required in the memory, future IO performance will benefit from the high deduplication rate, and less disk IO will be introduced. More importantly, the above advantages provided by the present disclosure can reduce cost for customers and bring better experience for the user.

FIG. 7 illustrates a block diagram of an example device 700 that can be used to implement embodiments of the present disclosure. For example, the electronic device 700 may be used to implement the computing device 130 shown in FIG. 1. As shown in the drawing, the electronic device 700 includes a central processing unit (CPU) 701 which may perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An input/Output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The processing unit 701 performs the various methods and processing described above, such as the process 200. For example, in some embodiments, the various methods and processing described above may be implemented as a computer software program or a computer program product, which is tangibly included in a machine-readable medium, such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more steps of any process described above may be implemented. Alternatively, in other embodiments, the CPU 701 may be configured in any other suitable manners (for example, by means of firmware) to perform a process such as the process 200.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination described above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A method for data migration, comprising:
obtaining feature data of a plurality of logical storage units in a first storage device, the feature data comprising deduplication information of each of the plurality of logical storage units;
determining, based on the feature data, a set of similarity values between the plurality of logical storage units;
migrating a logical storage unit having a similarity value higher than a similarity threshold among the plurality of logical storage units from the first storage device to a second storage device different from the first storage device;
performing deduplication operations on data blocks in the plurality of logical storage units;
counting the deduplication operations on at least some of the data blocks; and determining data blocks for which the number of deduplication operations is greater than a threshold number as deduplicated data blocks.

2. The method according to claim 1, wherein obtaining the feature data comprises:
for a first logical storage unit of the plurality of logical storage units,
obtaining the number of occurrences of each of a plurality of deduplicated data blocks in the first logical storage unit; and
determining, based on the number of occurrences of each deduplicated data block, first feature data of the first logical storage unit as part of the feature data.

3. The method according to claim 2, wherein determining, based on the feature data, the set of similarity values comprises:
determining a similarity value between the first feature data and second feature data of a second logical storage unit of the plurality of logical storage units as part of the set of similarity values.

4. The method according to claim 1, wherein migrating the logical storage unit having a similarity value higher than a similarity threshold to the second storage device comprises:
creating a data transfer queue for the logical storage units in the first storage device;
arranging a first logical storage unit of the plurality of logical storage units at a first position of the data transfer queue;
determining, from other logical storage units in the plurality of logical storage units than the first logical storage unit, a second logical storage unit whose similarity value with the first logical storage unit is higher than the similarity threshold; and
arranging the second logical storage unit at a second position after the first position in the data transfer queue to perform the migration.

5. The method according to claim 4, wherein migrating the logical storage unit having a similarity value higher than a similarity threshold to the second storage device further comprises:
determining, from other logical storage units in the plurality of logical storage units than the first logical storage unit and the second logical storage unit, a third logical storage unit whose similarity value with the second logical storage unit is higher than the similarity threshold or other similarity thresholds; and
arranging the third logical storage unit at a third position after the second position in the data transfer queue to perform the migration.

6. The method according to claim 4, wherein the first logical storage unit is a logical storage unit with the highest deduplication ratio among the plurality of logical storage units.

7. The method according to claim 1, wherein the deduplication operation and a deduplication operation in the second storage device are both performed based on a hash value of each data block.

8. The method according to claim 1, wherein the similarity value is Euclidean distance or Pearson correlation coefficient.

9. The method according to claim 1, wherein inline deduplication units residing with the first storage device are constructed and arranged to access respective hash tables to perform deduplication to generate at least some of the deduplication information.

10. The method according to claim 9, wherein other inline deduplication units reside within the second storage device.

11. The method according to claim 10, wherein the other inline deduplication units residing with the second storage device are constructed and arranged to access a shared global hash table to perform deduplication.

12. An electronic device, comprising:
a processor; and
a memory coupled to the processor and having instructions stored therein, wherein the instructions, when executed by the processor, cause the electronic device to perform actions comprising:
obtaining feature data of a plurality of logical storage units in a first storage device, the feature data comprising deduplication information of each of the plurality of logical storage units;
determining, based on the feature data, a set of similarity values between the plurality of logical storage units; and
migrating a logical storage unit having a similarity value higher than a similarity threshold among the plurality of logical storage units from the first storage device to a second storage device different from the first storage device;
wherein migrating the logical storage unit having a similarity value higher than a similarity threshold to the second storage device comprises:
creating a data transfer queue for the logical storage units in the first storage device;
arranging a first logical storage unit of the plurality of logical storage units at a first position of the data transfer queue;
determining, from other logical storage units in the plurality of logical storage units than the first logical storage unit, a second logical storage unit whose similarity value with the first logical storage unit is higher than the similarity threshold; and
arranging the second logical storage unit at a second position after the first position in the data transfer queue to perform the migration.

13. The device according to claim 12, wherein obtaining the feature data comprises:
for a first logical storage unit of the plurality of logical storage units,
obtaining the number of occurrences of each of a plurality of deduplicated data blocks in the first logical storage unit; and
determining, based on the number of occurrences of each deduplicated data block, first feature data of the first logical storage unit as part of the feature data.

14. The device according to claim 13, wherein determining, based on the feature data, the set of similarity values comprises:
determining a similarity value between the first feature data and second feature data of a second logical storage unit of the plurality of logical storage units as part of the set of similarity values.

15. The device according to claim 12, wherein migrating the logical storage unit having a similarity value higher than a similarity threshold to the second storage device further comprises:
determining, from other logical storage units in the plurality of logical storage units than the first logical storage unit and the second logical storage unit, a third logical storage unit whose similarity value with the second logical storage unit is higher than the similarity threshold or other similarity thresholds; and arranging the third logical storage unit at a third position after the second position in the data transfer queue to perform the migration.

16. The device according to claim 12, wherein the first logical storage unit is a logical storage unit with the highest deduplication ratio among the plurality of logical storage units.

17. The device according to claim 12, wherein the actions further comprise:
performing deduplication operations on data blocks in the plurality of logical storage units;
counting the deduplication operations on at least some of the data blocks; and
determining data blocks for which the number of deduplication operations is greater than a threshold number as deduplicated data blocks.

18. The device according to claim 17, wherein the deduplication operation and a deduplication operation in the second storage device are both performed based on a hash value of each data block.

19. The device according to claim 12, wherein the similarity value is Euclidean distance or Pearson correlation coefficient.

20. A computer program product having a non-transitory computer readable medium which stores a set of instructions to perform data migration; the set of instructions, when carried out by computerized circuitry, causing the computerized circuitry to perform a method of:
obtaining feature data of a plurality of logical storage units in a first storage device, the feature data comprising deduplication information of each of the plurality of logical storage units;
determining, based on the feature data, a set of similarity values between the plurality of logical storage units; and
migrating a logical storage unit having a similarity value higher than a similarity threshold among the plurality of logical storage units from the first storage device to a second storage device different from the first storage device;
wherein obtaining the feature data comprises:
for a first logical storage unit of the plurality of logical storage units,
obtaining the number of occurrences of each of a plurality of deduplicated data blocks in the first logical storage unit; and
determining, based on the number of occurrences of each deduplicated data block, first feature data of the first logical storage unit as part of the feature data.

* * * * *